United States Patent
Ragnoli et al.

(10) Patent No.: US 12,010,237 B2
(45) Date of Patent: Jun. 11, 2024

(54) SYSTEM AND METHOD FOR DIGITAL PROOF GENERATION

(71) Applicant: QPQ Ltd., Dublin (IE)

(72) Inventors: Emanuele Ragnoli, Dublin (IE); Roberto Ripamonti, Guanzate (IT)

(73) Assignee: QPQ Ltd., Dublin (IE)

( * ) Notice: Subject to any disclaimer, the term of this patent is extended or adjusted under 35 U.S.C. 154(b) by 375 days.

(21) Appl. No.: 17/583,880

(22) Filed: Jan. 25, 2022

(65) Prior Publication Data
US 2023/0239153 A1 Jul. 27, 2023

(51) Int. Cl.
*H04L 9/32* (2006.01)
*G06F 16/22* (2019.01)
*G06F 16/2452* (2019.01)
*H04L 9/00* (2022.01)

(52) U.S. Cl.
CPC ........ *H04L 9/3221* (2013.01); *G06F 16/2255* (2019.01); *G06F 16/24524* (2019.01); *H04L 9/008* (2013.01); *H04L 9/3236* (2013.01); *H04L 9/3297* (2013.01)

(58) Field of Classification Search
CPC ..... H04L 9/3221; H04L 9/008; H04L 9/3236; H04L 9/3297; G06F 16/2255; G06F 16/24524
See application file for complete search history.

(56) References Cited

U.S. PATENT DOCUMENTS

| | | | |
|---|---|---|---|
| 2018/0337775 A1 | 11/2018 | Camenisch et al. | |
| 2020/0034458 A1* | 1/2020 | Mehta | G06F 16/2255 |
| 2020/0126075 A1* | 4/2020 | Fisch | G06F 21/6245 |
| 2021/0336771 A1* | 10/2021 | Mukherjee | H04L 9/0869 |

OTHER PUBLICATIONS

Fournet, Cédric, et al. "{ZQL}: A Compiler for {Privacy-Preserving} Data Processing." 22nd USENIX Security Symposium (USENIX Security 13). 2013. (Year: 2013).*
(Continued)

*Primary Examiner* — Luu T Pham
*Assistant Examiner* — Paul J Skwierawski
(74) *Attorney, Agent, or Firm* — Young Basile Hanlon & MacFarlane, P.C.

(57) ABSTRACT

A system and a method for digital proof generation are provided. The system includes a data management module to manage dataset having plurality of data rows and a query execution and verification module including a commitment storage sub-module, a query execution sub-module and a result verification sub-module. The data management module receives query from the query execution sub-module, related to operation on data rows of plurality of data rows, which is processed to generate execution result associated with data rows. The execution result is transferred along with data rows to the query execution sub-module. A set of commitments associated with execution result is transferred to the commitment storage sub-module. The query execution sub-module transfers set of commitments, from the commitment storage sub-module, and data rows to the result verification sub-module for verification, and receives a verification result from the result verification sub-module.

19 Claims, 7 Drawing Sheets

(56) References Cited

OTHER PUBLICATIONS

Haber, Stuart, et al. Privacy-preserving verification of aggregate queries on outsourced databases. Technical Report HPL-2006-128, HP Labs, 2006. (Year: 2006).*
Fournet et al., "ZQL: A Compiler for Privacy-Preserving Data Processing", Feb. 1, 2013, 20 pgs.
Hewlett-Packard Packard et al., "Privacy-preserving verification of aggregate queries on outsourced database", Research Disclosure, Kenneth Mason Publications, Hampshire, UK, GB, vol. 528, No. 45, Apr. 1, 2008, p. 349, ISSN: 0374-4353.

* cited by examiner

SYSTEM AND METHOD FOR DIGITAL PROOF GENERATION

FIELD OF THE PRESENT DISCLOSURE

The present disclosure generally relates to verifiable computing, and more particularly to a system and method for generation of digital proof for operations executed on a dataset without disclosing the entire dataset in verifiable computing.

BACKGROUND

Verifiable computing (or verified computation or verified computing) enables a computer to offload the computation of some function, to other perhaps clients, while maintaining verifiable results. The other clients evaluate the function and return the result with a proof that the computation of the function was carried out correctly. Verifiable computing applied to database technologies, where the execution of a data query on a dataset is complete, correct, and done with real time dataset updates without revealing the underlying dataset, is an active area of research without robust products and technologies. In some scenarios, the clients to whom the computational tasks are outsourced may not be trustworthy. In such cases, the systems employing verifiable computing may find it difficult to confirm an accuracy of the outsourced computational tasks. For such scenarios, a proof of the performed computational tasks may be generated by the client and send to the users along with the computational tasks. However, the conventional systems fail to guarantee completeness and accuracy of the computational tasks in real-time, without revelation of the underlying dataset.

The present disclosure has been made in view of such considerations, and it is an object of the present disclosure to provide systems and methods for verifiable computing with reliability and accuracy.

SUMMARY

In an aspect of the present disclosure, a system for generation of a digital proof is disclosed. The system comprises a data management module configured to manage a dataset having a plurality of data rows. Herein, each data row of the plurality of data rows includes data entries and each data row possess a hash value and a commitment for the hash value associated with the corresponding data entries. The system further comprises a query execution and verification module. The query execution and verification module comprises a commitment storage sub-module configured to store a plurality of commitments of the dataset; a query execution sub-module configured to enable access to the dataset; and a result verification sub-module configured to verify an execution of a query. Herein, the data management module is configured to: receive a query from the query execution sub-module, the query being related to an operation on one or more data rows of the plurality of data rows of the dataset; process the query to generate an execution result associated with the said one or more data rows; transfer the execution result associated with the one or more data rows of the dataset along with the one or more data rows to the query execution sub-module; and transfer a set of commitments associated with the execution result to the commitment storage sub-module. Further, herein in the query execution and verification module, the query execution sub-module is configured to: transfer the set of commitments, from the commitment storage sub-module, and the said one or more data rows to the result verification sub-module for verification; and receive a verification result from the result verification sub-module, based on the verification.

In one or more embodiments, the set of commitments includes at least one of a homomorphic hash value of the dataset, a zero-knowledge proof associated with the execution result and a timestamp associated with each commitment of the set of commitments.

In one or more embodiments, the set of commitments correspond to one of Pedersen commitments or Generalized Pedersen commitments.

In one or more embodiments, the query execution sub-module is configured to check that a first timestamp of a first commitment value of the set of commitments to be preceding a time of the generation of the execution result and a second timestamp of a second commitment value of the set of commitments to be succeeding the time of the generation of the execution result, to indicate a successful verification.

In one or more embodiments, the query corresponds to at least one of an update of the one or more data rows of the dataset and an analysis of the one or more data rows of the dataset.

In one or more embodiments, in case of the query being the update of the one or more data rows of the dataset, the result verification sub-module is configured to apply a homomorphic hash technique on the execution result to generate a first update hash value; apply one of an addition operation or a subtraction operation to a first commitment value and a second commitment value of the set of commitments to obtain a second update hash value; compare the first update hash value and the second update hash value; and generate the verification result indicative of a successful verification, if the first update hash value matches the second update hash value.

In one or more embodiments, the result verification sub-module is configured to generate the verification result indicative of a failed verification, if the first update hash value does not match the second update hash value.

In one or more embodiments, in case of the query being the analysis of the one or more data rows of the dataset, the result verification sub-module is configured to apply a homomorphic hash technique to the one or more data rows included in the execution result and verify that they are included in the set of homomorphic hash values related to the data rows of the dataset included in the execution result; apply an addition operation on the one or more homomorphic hash values related to the data rows of the dataset to generate a first analysis hash value; retrieve a latest commitment value of the set of commitments from the commitment storage sub-module; generate a first validation based on confirming that the first analysis hash value matches a latest analysis hash value included in the retrieved latest commitment value; generate a second validation based on confirming that a zero-knowledge proof associated with the execution result is valid; and generate the verification result indicative of a successful verification, in response to generation of the first validation and the second validation.

In one or more embodiments, the result verification sub-module is configured to generate the verification result indicative of a failed verification, in response to at least one of failure of generation of the first validation or failure of generation of the second validation.

In one or more embodiments, the dataset is a private dataset.

In another aspect of the present disclosure, a method for generation of a digital proof is disclosed. The method comprises receiving a query from a query execution sub-module, the query being related to an operation on one or more data rows of the plurality of data rows of the dataset. The method further comprises processing the query to generate an execution result associated with the said one or more data rows. The method further comprises transferring the execution result associated with the one or more data rows of the dataset along with the one or more data rows to the query execution sub-module. The method further comprises transferring a set of commitments associated with the execution result to a commitment storage sub-module. The method further comprises transferring, by the query execution sub-module, the set of commitments, from the commitment storage sub-module, and the said one or more data rows to a result verification sub-module for verification. The method further comprises receiving a verification result from the result verification sub-module, based on the verification.

In one or more embodiments, the query corresponds to at least one of update of the one or more data rows of the dataset and an analysis of the one or more data rows of the dataset.

In one or more embodiments, in case of the query being the update of the one or more data rows of the dataset, the method comprises applying a homomorphic hash technique on the execution result to generate a first update hash value; applying one of an addition operation or a subtraction operation to a first commitment value and a second commitment value of the set of commitments to obtain a second update hash value; comparing the first update hash value and the second update hash value; and generating the verification result indicative of a successful verification, if the first update hash value matches the second update hash value.

In one or more embodiments, the method comprises generating the verification result indicative of a failed verification, if the first update hash value does not match the second update hash value.

In one or more embodiments, in case of the query being the analysis of the one or more data rows of the dataset, the method includes applying a homomorphic hash technique to the one or more data rows included in the execution result and verify that they are included in the set of homomorphic hash values related to the data rows of the dataset included in the execution result; applying an addition operation on the one or more homomorphic hash values related to the data rows of the dataset to generate a first analysis hash value; retrieving a latest commitment value of the set of commitments from the commitment storage sub-module; generating a first validation based on confirming that the first analysis hash value matches a latest analysis hash value included in the retrieved latest commitment value; generating a second validation based on confirming that a zero-knowledge proof associated with the execution result is valid; and generating the verification result indicative of a successful verification, in response to generation of the first validation and the second validation.

In one or more embodiments, the method includes generating the verification result indicative of a failed verification, in response to at least one of failure of generation of the first validation or failure of generation of the second validation.

In yet another aspect, a non-transitory computer-readable medium having stored thereon software instructions that, when executed by a processor, cause the processor to be implemented for digital proof generation is disclosed. The processor executes the steps comprising receiving a query from a query execution sub-module, the query being related to an operation on one or more data rows of the plurality of data rows of the dataset; processing the query to generate an execution result associated with the said one or more data rows; transferring the execution result associated with the one or more data rows of the dataset along with the one or more data rows to the query execution sub-module; transferring a set of commitments associated with the execution result to a commitment storage sub-module; transferring, by the query execution sub-module, the set of commitments, from the commitment storage sub-module, and the said one or more data rows to a result verification sub-module for verification; and receiving a verification result from the result verification sub-module, based on the verification.

In one or more embodiments, the query corresponds to at least one of update of the one or more data rows of the dataset and an analysis of the one or more data rows of the dataset.

In one or more embodiments, in case of the query being the update of the one or more data rows of the dataset, the processor is configured to execute the steps comprising applying a homomorphic hash technique on the execution result to generate a first update hash value; applying one of an addition operation or a subtraction operation to a first commitment value and a second commitment value of the set of commitments to obtain a second update hash value; comparing the first update hash value and the second update hash value; and generating the verification result indicative of a successful verification, if the first update hash value matches the second update hash value.

In one or more embodiments, in case of the query being the analysis of the one or more data rows of the dataset, the processor is configured to execute the steps comprising applying a homomorphic hash technique to the one or more data rows included in the execution result and verify that they are included in a set of homomorphic hash values related to the data rows of the dataset included in the execution result; applying an addition operation on the one or more homomorphic hash values related to the data rows of the dataset to generate a first analysis hash value; retrieving a latest commitment value of the set of commitments from the commitment storage sub-module; generating a first validation based on confirming that the first analysis hash value matches a latest analysis hash value included in the retrieved latest commitment value; generating a second validation based on confirming that a zero-knowledge proof associated with the execution result is valid; and generating the verification result indicative of a successful verification, in response to generation of the first validation and the second validation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
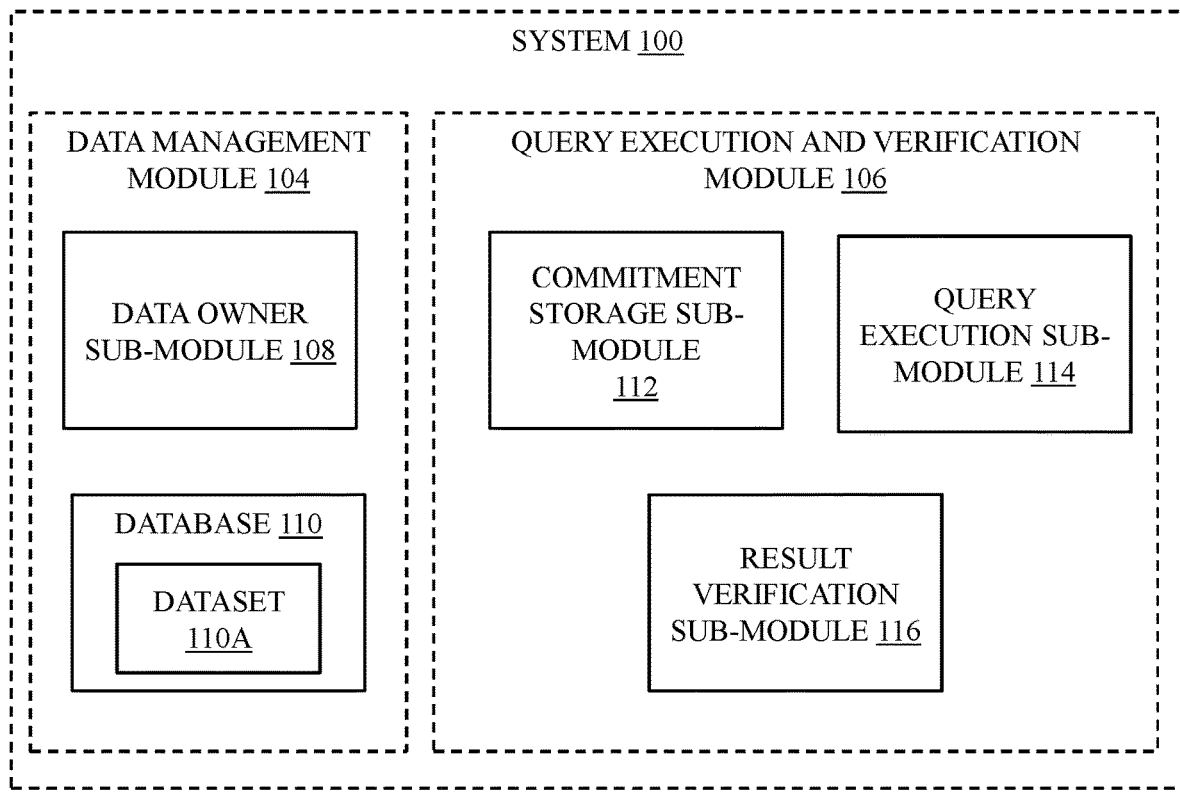
FIG. 1 illustrates a block diagram of a system for generation of a digital proof, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

Moreover, in particular a person skilled in the art, with knowledge of the method claim/method claims, is of course aware of all routine possibilities for realizing products or possibilities for implementation in the prior art, and so there is no need in particular for independent disclosure in the description. In particular, these customary realization variants known to the person skilled in the art can be realized exclusively by hardware components or exclusively by software components. Alternatively and/or additionally, the person skilled in the art, within the scope of his/her expert ability, can choose to the greatest possible extent arbitrary combinations according to embodiments of the invention for hardware components and software components in order to implement realization variants according to embodiments of the invention.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

FIG. 1 shows an exemplary embodiment of the present disclosure as a schematic diagram of a system 100 for generation of a digital proof. In present implementation, the system 100 may reside on or may be executed by one or multiple computing devices, which may be connected to a network (e.g., the internet or a local area network), such as a network. Details of the computing device (also referred to as "computing environment") are provided, for example, in FIG. 6.

Referring to FIG. 1 as illustrated, a schematic diagram of a system 100 for digital proof generation is illustrated, in accordance with one or more embodiments of the present disclosure. The system 100 includes a data management module 104 and a query execution and verification module 106. The data management module 104 includes a data owner sub-module 108 and a database 110. As used herein, the term database is used broadly to include any known or convenient means for storing data, whether centralized or distributed, relational or otherwise. The database 110 includes a dataset 110A. In the system 100, the database 110 is configured to receive information (such as the dataset 110A) and store, organize, and process the received information in a way that enables users to easily and intuitively go back and find details they are searching for in the database 110. In some embodiments, the dataset 110A is a private dataset, and thus the data stored of the dataset 110A is accessible and viewable to authorized users. For the purposes of the present disclosure, in one or more embodiments, the content, including the data entries of the dataset 110A is accessible to the data owner sub-module 108.

In the present system 100, the data owner sub-module 108 may include hardware and software components (for example, cloud-based components) that are configured to host applications that manage the dataset 110A of the database 110 and a corresponding set of commitments associated with a commitment scheme. As used herein, the commitment scheme is a cryptographic primitive that may enable a commitment to a chosen value (or a chosen statement) while keeping the value hidden from other entities, with an ability to reveal the committed value later when needed. The commitment schemes are designed in a manner that a party is unable change the committed value or statement after they have committed to the chosen value. Thereby, at least for purposes of the present disclosure, it may be understood that the commitment schemes are cryptographically binding in nature.

Further, in the present system 100, the query execution and verification module 106 includes a commitment storage sub-module 112, a query execution sub-module 114, and a result verification sub-module 116. The commitment storage sub-module 112 may be a public data storage that may store every commitment (such as a homomorphic hash value and a zero-knowledge proof) of the dataset 110A. The commitment storage sub-module 112 is configured to enforce an order of homomorphic hash values and the zero-knowledge proof of the dataset 110A by storing triple samples of a type 'timestamp, the homomorphic hash value and the zero-knowledge proof. The triple samples pair the homomorphic hash value and the zero-knowledge proof with a time (such as the timestamp) of publication. The commitment storage sub-module 112 is further configured to provide public access to the homomorphic hash value and the zero-knowledge proof, on a condition that the homomorphic hash value and the zero-knowledge proof do not reveal any information about the dataset 110A.

Also, in the present system 100, the query execution sub-module 114 may include hardware and software components (for example, cloud-based components) that enable access to the dataset 110A and to a query result verification protocol. In the embodiments of the present disclosure, a query satisfies a correctness property if corresponding query result includes only values that satisfy the query itself. The query result verification protocol (or a digital proof protocol or a digital verification protocol) enables proving that an execution of queries on the dataset 110A are correct and complete, without disclosing the dataset 110A itself. Further, the query result verification protocol is not trivial, and requires a combined use of homomorphic hashing, zero-knowledge proof, the commitment scheme, and database technologies (such as associated with the database 110A).

In present examples, in general, the homomorphic hashing is utilized to apply hash functions to generate homomorphic hash values. In particular, the homomorphic hashing is implemented to enable arithmetic operations to be performed on hashed data, providing a possibility to add (or subtract) two hashed data elements to generate a result that is equivalent to a result obtained by hashing the two data elements together. The homomorphic hash values provide a map from an input data of any length to a fixed sized output set. The values returned by the hash function are the homomorphic hash values (or hash codes, digests, or simply hashes).

Further, the zero-knowledge proof, as used herein, enables proving possession of knowledge of certain information without revealing the information itself or any additional detail. For example, the queries associated with the dataset 110A may be proved by use of the zero-knowledge proof without revealing the dataset 110A. Thus, the zero-knowledge proof may be utilized by one party to prove to another party that a given statement is true, without revealing any additional information related to the statement.

In the present system 100, the result verification sub-module 116 enables the query execution sub-module 114 to verify the correct result (such as an execution result) of an update or selection query executed by the data owner sub-module 108. Based on a successful verification, the result verification sub-module 116 outputs a verified result that indicates a successful verification. Further, based on a failed verification, the result verification sub-module 116 outputs the verified result that indicates a failed verification.

In operation, the data management module 104 is configured to receive a query from the query execution sub-module 114, the query being related to an operation on one or more data rows of the plurality of data rows of the dataset 110A. The data management module 104 processes the query to generate an execution result associated with the said one or more data rows. Further, the data management module 104 transfers the execution result associated with the one or more data rows of the dataset 110A along with the one or more data rows to the query execution sub-module 114. The data management module 104 transfers a set of commitments associated with the execution result to the commitment storage sub-module 112. Moreover, the query execution sub-module 114 is configured to transfer the set of commitments, from the commitment storage sub-module 112, and the said one or more data rows to the result verification sub-module 116 for verification. Furthermore, the query execution sub-module 114 receives a verification result from the result verification sub-module 116, based on the verification. Details of the verification of the execution of the first query are explained further in the description in reference to FIG. 2.

Figure 2:
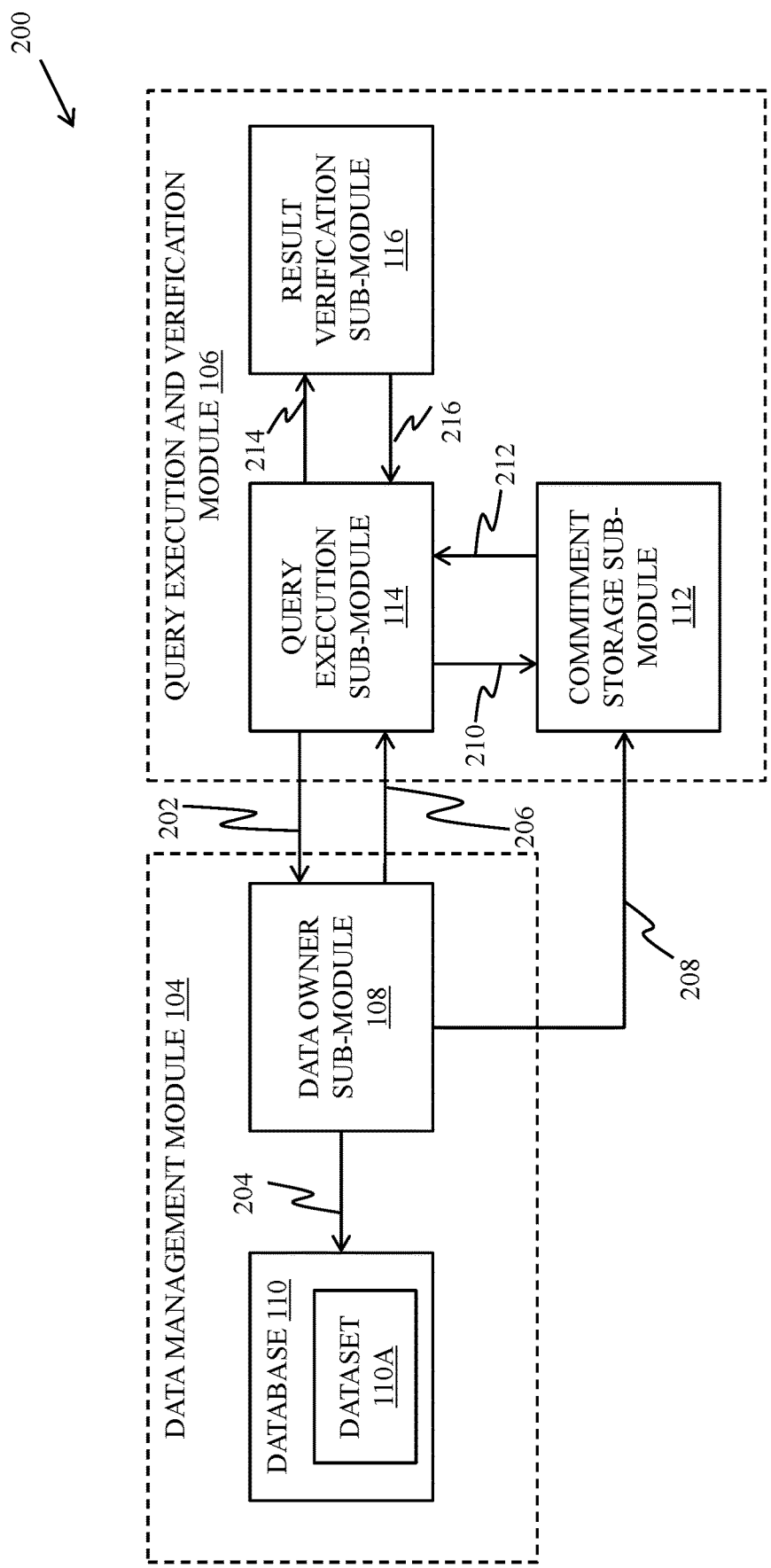
FIG. 2 illustrates a schematic diagram depicting operation of the system for generation of a digital proof, in accordance with one or more exemplary embodiments of the present disclosure.

FIG. 2 illustrates a schematic diagram depicting operation of the system for generation of a digital proof, in accordance with one or more exemplary embodiments of the present disclosure. With reference to FIG. 2, there is shown an operational architecture 200 that depicts flow of operations between the components of the data management module 104 and the query execution and verification module 106 shown in FIG. 1.

Herein, the data management module 104 is configured to manage the dataset 110A which may have a plurality of data rows. Each data row of the plurality of data rows includes data entries and each data row possess a hash value and a commitment for the hash value associated with the corresponding data entries. As discussed, herein, the hash value may be a homomorphic hash value. Furthermore, the dataset 110A may be owned by the data owner sub-module 108. In one or more embodiments of the present disclosure, the commitment may be in the form of a Pedersen commitment related to the hash value associated with the data entries, as known in the art.

As discussed, the query execution and verification module 106 includes the commitment storage sub-module 112 configured to store a plurality of commitments of the dataset 110A. Also, the query execution and verification module 106 further includes the query execution sub-module 114 that is configured to enable access to the dataset 110A. The query execution sub-module 114 is further configured to enable access to a query result verification protocol. Further, the query execution and verification module 106 includes the result verification sub-module 116 that is configured to verify an execution of a query. Herein, the query may be related to one or more data rows of the plurality of data rows of the dataset 110A.

Referring to FIG. 2, as represented by reference numeral 202, the data management module 104 is configured to receive a query from the query execution sub-module 114. Herein, the query is related to an operation on the one or more data rows of the plurality of data rows of the dataset 110A. In an embodiment, the data owner sub-module 108 receives the query from the query execution sub-module 114. In some embodiments, the query may be a semantic or an analytical query. In accordance with an embodiment, the query corresponds to at least one of an update of the one or more data rows of the dataset 110A or an analysis of the one or more data rows of the dataset 110A. In an example, the update of the one or more data rows corresponds to deletion of the one or more data rows of the dataset 110A. In an example, the analysis of the one or more data rows corresponds to reception of the data entries of the one or more data rows. For example, the reception of the data entries may be required by a new owner (such as the authorized user) of the one or more data rows.

Further, referring to FIG. 2, as represented by reference numeral 204, the data management module 104 is configured to process the query to generate an execution result associated with the said one or more data rows. In some embodiments, the data owner sub-module 108 to processes the query to generate the execution result associated with the said one or more data rows. It may be understood that the processing of the query may correspond to execution of the query. In an embodiment, the data owner sub-module 108 enforces access to the database 110A relying on an access policies sub-module (not shown), to execute the queries for generation of the execution result.

The access policies sub-module enables the data owner sub-module 108 to define rules and policies to who can access the data (such as external users) and the kind of queries the users may execute (such as update queries or analytical queries) on the database 110. Further, the access policies sub-module includes but is not limit to role-based access control (RB AC) and attribute-based access control (ABAC). When a request to execute a query (such as the update query or the analytical query) is sent to the data owner sub-module 108, the access policies sub-module checks if the sender is entitled to execute such kind of query and if the content of the query is compliant to the policies.

In case the query corresponds to the analysis of the one or more data rows, the execution result includes the one or more data rows included in the dataset 110A and the homomorphic hash values of the one or more data rows. Further, the zero-knowledge proof of a number of rows returned by the query may be included in the execution result. In other words, running an aggregate query, that counts the number of rows in the dataset 110A while satisfying a same filter condition of the analytical query, is included in the execution result.

In case the query corresponds to the update of the one or more data rows, the execution result includes a set of commitments of the dataset 110A. In accordance with an embodiment, the set of commitments includes at least one of the homomorphic hash value of the dataset 110A, the zero-knowledge proof associated with the execution result and a timestamp associated with each commitment of the set of commitments.

In one or more embodiments, the data owner sub-module 108 utilizes a homomorphic hash technique to generate the homomorphic hash values of new data when added in a row (or rows) of the dataset 110A. Further, a commitment scheme is utilized to generate a Pedersen commitment of the homomorphic hash value of the new data when it is added to the row (or rows) of the dataset 110A.

Furthermore, the data owner sub-module 108 utilizes the homomorphic hash technique to accumulate the homomorphic hash value of the set of commitments of the data included in the dataset 110A. In some embodiments, the set of commitments corresponds to the Pedersen commitments or Generalized Pedersen commitments. Such set of commitments may provide enhanced encryption of the data. Thus, the cumulated hash value substitutes classical Merkle tree data structure of the conventional systems to prove the authenticity of the Pedersen commitments of the data contained in the dataset 110A.

Moreover, the data owner sub-module 108 generates the zero-knowledge proof over the Pedersen commitments of the data inside the dataset 110A; thus, utilizing the cumulated hash value as authenticity of the used Pedersen commitment values. Therefore, such value may be obtained by updating older cumulated hash value and summing (or subtracting) the homomorphic hash value of Pedersen commitment referencing added (or removed) data.

Furthermore, the homomorphic hash technique may be utilized to accumulate the homomorphic hash value of the data included in the dataset 110A, which is published to the commitment storage sub-module 112, together with the zero-knowledge proof. Furthermore, the set of commitments published in the commitment storage sub-module 112 may be utilized to prove that an update to the dataset 110A has been executed correctly.

Further, referring to FIG. 2, as represented by reference numeral 206, the data management module 104 is further configured to transfer the execution result associated with the one or more data rows of the dataset 110A along with the one or more data rows to the query execution sub-module 114. In some embodiments, the data owner sub-module 108 transfers the execution result associated with the one or more data rows of the dataset 110A along with the one or more data rows to the query execution sub-module 114. The execution result may include the proofs (such as the zero-knowledge proof) associated with the execution result. Herein, the execution result is received as an input by the query execution sub-module 114.

Further, referring to FIG. 2, as represented by reference numeral 208, the data management module 104 is configured to transfer the set of commitments associated with the execution result to the commitment storage sub-module 112. In some embodiments, the data owner sub-module 108 transfers the set of commitments associated with the execution result to the commitment storage sub-module 112.

In an embodiment, in case the query corresponds to the update of the one or more data rows, the data owner sub-module 108 is configured to confirm the update by transferring a new commitment (of the set of commitments) that includes the homomorphic hash value of the dataset 110A and the zero-knowledge proof to the commitment storage sub-module 112. The data owner sub-module 108 further transfers the updated (such as a deleted) row of the plurality of rows to the query execution sub-module 114.

In an exemplary scenario, the data owner sub-module 108 may be a service provider. The external users may be the users of the service as provided by the data owner sub-module 108. Herein, personal data of the users may be provided by the users during registration for the services of the data owner sub-module 108. The data owner sub-module 108 may store the personal data provided by the users. In certain examples, the external user may require or wish to remove the personal data from the data owner sub-module 108. For example, the services provided by the data owner sub-module 108 may not be required by the said external user anymore. In such a case, the query corresponds to deletion of the one or more rows associated with the personal data of the user. Further, the data owner sub-module 108 may allow the user to check and confirm the deletion of the personal data from the dataset 110.

In an embodiment, in case the query corresponds to the analysis of the one or more data rows, the data owner sub-module 108 is configured to transfer the resulting rows of the plurality of rows to the query execution sub-module 114. Further, the data owner sub-module 108 transfers the set of commitments that includes the homomorphic hash values of all the rows contained in the dataset 110A and the zero-knowledge proof related to the number of rows returned by the execution of the query to the query execution sub-module 114. In an embodiment, the requested set of commitments may be a latest set of commitments associated with the dataset 110A. The set of commitments may be required by the result verification sub-module 116 for a comparison between the latest set of commitments obtained from the commitment storage sub-module 112, specifically the homomorphic hash value of the dataset 110A, with the sum of the homomorphic hash values of all the data rows included in the dataset 110A, as received from the data owner sub-module 108.

In an embodiment, in case the query corresponds to the update of the one or more data rows, the query execution and verification module 106 requests (or asks) for two latest commitments from the commitment storage sub-module 112. The commitment storage sub-module 112 transfers the set of commitments, such as a first commitment value C1 and a second commitment value C2, in which each of the commitment values include a timestamp, the homomorphic hash value of the dataset 110A and the zero-knowledge proof.

In accordance with an embodiment, the query execution sub-module 114 is configured to check that a first timestamp of the first commitment value C1 of the set of commitments to be preceding a time of the generation of the execution result and a second timestamp of the second commitment value C2 of the set of commitments to be succeeding the time of the generation of the execution result, to indicate a successful verification. in an example, at time T, the first commitment value C1 of the dataset H(D) 110, the zero-knowledge proof, and the first Timestamp T1 are stored in the commitment storage sub-module 112. At time (T+1), an update query (such as deletion of a row) is executed on the dataset 110A, hence a new commitment, such as the second commitment value C2 of the dataset H(D) 110, the zero-knowledge proof, and the second timestamp (T2) is sent to the commitment storage sub-module 112. Thus, the query execution sub-module 114 checks that the homomorphic hash value (X) of the execution result of the update query executed at the time (T+1) resolves the following equation:

$$C1[H(D)] - X = C2[H(D)].$$

Furthermore, the query execution sub-module 114 checks that the first Timestamp T1 associated with the first commitment value C1 is preceding to the second timestamp (T2) associated with the second commitment value C2. In an embodiment, the timestamps may be a Unix timestamp (such as nanoseconds or milliseconds or seconds since Jan. 1, 1970) or ISO8601 or any other kind of time representation.

In an embodiment, in case the query corresponds to the analysis of the one or more data rows, the query execution and verification module 106 requests (or asks) for a latest commitment value from the commitment storage sub-module 112, upon reception of the execution result, the homomorphic hash values and the zero-knowledge proof from the data owner sub-module 108. Further, the commitment storage sub-module 112 transfers the latest commitment value that includes the timestamp, the homomorphic hash value of the dataset 110A and the zero-knowledge proof to the query execution and verification module 106.

Further, referring to FIG. 2, as represented by reference numeral 214, the query execution sub-module 114 is further configured to transfer the set of commitments, from the commitment storage sub-module 112, and the said one or more data rows to the result verification sub-module 116 for verification. The result verification sub-module 116 enables the query execution sub-module 114 to verify the correct result (such as the execution result) of the updated or selected query executed by the data owner sub-module 108.

In an embodiment, in case the query corresponds to the update of the one or more data rows, the query execution sub-module 114 is configured to transfer 214 the first commitment value C1, the second commitment value C2 and the updated row of the plurality of rows to the result verification sub-module 116 for verification.

In an embodiment, in case the query corresponds to the analysis of the one or more data rows, the query execution sub-module 114 is configured to transfer 214 the latest commitment value, the analyzed row of the plurality of rows of the dataset 110A and the execution result to the result verification sub-module 116 for the verification.

Further, referring to FIG. 2, as represented by reference numeral 216, the query execution sub-module 114 is further configured to receive a verification result from the result verification sub-module 116, based on the verification. Herein, the verification result corresponds to one of a successful verification or a failed verification.

In accordance with an embodiment, in case of the query being the update of the one or more data rows of the dataset 110A, the result verification sub-module 116 is configured to apply a homomorphic hash technique on the execution result to generate a first update hash value. The result verification sub-module 116 further applies one of an addition operation or a subtraction operation to the first commitment value C1 and the second commitment value C2 of the set of commitments to obtain a second update hash value.

In an embodiment, the operation applied between the first commitment value C1 and the second commitment value C2 is the subtraction operation. For example, given that the second timestamp associated with the second commitment value C2 is older compared to the first timestamp associated with the first commitment value C1, then if the update query is a deletion query, the operation corresponds to C1−C2 to obtain the second update hash value. If the update query is an insertion query, the operation corresponds to C2−C1 to obtain the second update hash value.

The result verification sub-module 116 further compares the first update hash value and the second update hash value. In order to check that the second update hash value equals the first update hash value, the addition operation may be applied, i.e., the operation is moved to a single equation, where X is the first update hash value, such that C1−C2=X may be C1=X+C2, or C2−C1=X may be C2=X+C1.

Based on a match of the first update hash value with the second update hash value, the result verification sub-module 116 generates the verification result indicative of a successful verification. In some embodiments, when the first update hash value does not match with the second update hash value, the result verification sub-module 116 generates the verification result indicative of a failed verification.

In an exemplary scenario, the user may require to be allowed to verify the query of the update of the one or more data rows of the dataset 110A. Herein, the update request is successfully executed without giving access of the dataset 110A to the user. To enable such requirement, the data owner sub-module 108 is required to extend the data of the dataset 110A with the homomorphic hash value of the data itself and the Pedersen commitment value of the homomorphic hash value. For verification of the update request, the data owner sub-module 108 returns the rows of the dataset 110A affected by the update request. Further, the access is provided to the commitment storage sub-module 112, such that one may retrieve the latest commitments published by the data owner sub-module 108. Moreover, the result verification sub-module 116 may make use of the latest commitments values published by the data owner sub-module 108 on the commitment storage sub-module 112 and of the commitment values returned by the update request to verify the correct execution. Details of the exemplary scenarios of the cases when the query is the update query are further provided, for example, in FIGS. 3 and 4.

In accordance with an embodiment, in case of the query being the analysis of the one or more data rows of the dataset 110A, the result verification sub-module 116 is configured to apply a homomorphic hash technique to the one or more data rows included in the execution result and verify that they are included in the set of homomorphic hash values related to the data rows of the dataset 110A included in the execution result. Further, the result verification sub-module 116 applies the addition operation on the one or more homomorphic hash values related to the data rows of the dataset 110A to generate the first analysis hash value. The result verification sub-module 116 retrieves the latest commitment value of the set of commitments from the commitment storage sub-module 112. The result verification sub-module 116 further generates the first validation based on confirmation that the first analysis hash value matches the latest analysis hash value included in the retrieved latest commitment value. Furthermore, the result verification sub-module 116 generates the second validation based on confirming that the zero-knowledge proof associated with the execution result is valid. Moreover, the result verification sub-module 116 generates the verification result indicative of the successful verification, in response to generation of the first validation and the second validation.

In some embodiments, the zero-knowledge proof associated with the execution result is validated by selection of the Pedersen commitments. Further, the homomorphic hash technique is applied to obtain a cumulated homomorphic hash value of the Pedersen commitments. Moreover, a signature on the cumulated homomorphic hash value is checked to validate the zero-knowledge proof.

The result verification sub-module 116 further generates the verification result indicative of the successful verification, in response to generation of the first validation and the second validation. In some embodiments, the result verification sub-module 116 is configured to generate the verification result indicative of a failed verification, if the first update hash value does not match the second update hash value. For example, an unauthorized execution of the update query may have taken place. In such a case, the verification result indicates the failed verification.

In an exemplary scenario, the user may require to be allowed to verify the query of analysis of the one or more data rows of the dataset 110A. The requirement is for the data owner sub-module 108 to maintain the commitment storage sub-module 112 up-to-date after each analytical request. For verification of the analytical request, the data owner sub-module 108 may be required to return the rows of the dataset 110A while satisfying the query constraints. Further, the data owner sub-module 108 is required to return the homomorphic hash values of all the rows of the dataset 110A, while the commitment storage sub-module 112 provides the latest commitment. This enables the verification that, by executing the homomorphic hash method on the rows returned by the query, the result is part of the dataset 110A. Furthermore, the data owner sub-module 108 may be required to return the zero-knowledge proof related to the number of rows returned as result of the query. This enables to verify that the rows returned by the query are all and only those that satisfies the query constraint. Moreover, it is required that the commitment value provided by the commitment storage sub-module 112 includes the zero-knowledge proof. This enables verification that the homomorphic hash value contained in the commitment value is calculated on the totality of the dataset 110A. Thus, the combination of the above-mentioned verifications enables proof of completeness and soundness of the analytical query execution without disclosing the underlying dataset 110A. Details of the exemplary scenario of the cases when the query is the analysis query, are further provided, for example, in FIG. 5.

In accordance with an embodiment, result verification sub-module 116 is configured to generate the verification result indicative of the failed verification, in response to at least one of failure of generation of the first validation or failure of generation of the second validation. For example, an unauthorized execution of the analysis query may have taken place. In such a case, the verification result indicates the failed verification.

As opposed to the conventional zero-knowledge based methods, the system 100 of the present disclosure utilizes the homomorphic hash method to cumulate homomorphic hash values related to the set of commitments needed for the zero-knowledge proof protocols, to obtain a final value that may be used to provide authentication of the set of commitments of the values contained in the dataset 110A. It may be noted that the utilization of the homomorphic hash method instead of a conventional Merkle tree data structure method enables faster update on the value used for authentication in the event of a change in the underlying dataset 110A. Furthermore, the homomorphic hash method enables subtraction or addition of a homomorphic hash value from the cumulated hash value without the need to rebuild the entire data structure, as opposed to the rebuild of the entire data structure required in the Merkle tree data structure method.

The system 100 of the present disclosure combines the homomorphic hash techniques and the zero-knowledge proof protocols to provide data owners (associated with the data owner sub-module 108) a way to answer any kind of query, posed by a third party that do not have access to the dataset 110A, while providing a proof of completeness and correctness of the answer without disclosing the underlying dataset 110A. Moreover, the system 100 enables data the data owners to publish the set of commitments over the dataset 110A to give a third party, that does not have access to the dataset 110A, a way to check if an expected update on the dataset 110A is correctly performed by the data owner.

Moreover, the homomorphic hash value of the dataset 110A, computed performing the sum of the homomorphic hash over the values contained in the dataset 110A and that is stored in a separate field, and the corresponding zero-knowledge proof are published so that the data owner commits on a specific dataset. The zero-knowledge proof enables users to certify that the homomorphic hash value of the dataset 110A is both correct and complete. Furthermore, other entities participating in the digital protocol may require updates on the dataset 110A controlled by the data owner, receiving a proof that the dataset 110A has been correctly updated. The proof consists in the two latest commitments over the dataset 110A, that includes the homomorphic hash value together with corresponding zero-knowledge proof to certify correctness and completeness, and the row of the plurality of rows on which the update command may be executed.

Further, as per the present embodiments, the release of the set of commitments over the dataset 110A enables spotting of malicious behavior of the data owner that may commit on fake dataset updates. Further, the storage of the homomorphic hash values in the dataset 110A, together with the generation of the set of commitments thereon (which are stored in a separate field) enables entities participating in the digital protocol to require selection queries on the dataset 110A, receiving both the values related to the query, and the corresponding zero-knowledge proof that the result of the query is correct, valid and complete. The combination of the homomorphic hash and the set of commitments, together with the commitment of the whole dataset 110A, enables catching of malicious behavior of the data owner that may reply with fake data when asked for execution of queries on its the dataset 110A. Furthermore, the system 100 enables replacement of data structure with a homomorphic hash technique which cumulates the homomorphic hash values of the set of commitments, allowing a faster update on this structure in the event of a change in the underlying data set as compared to conventional systems. The faster update is the result of subtracting or adding the homomorphic hash values from the cumulated one instead of updating the whole Merkle tree as performed in the conventional systems.

Figure 3:
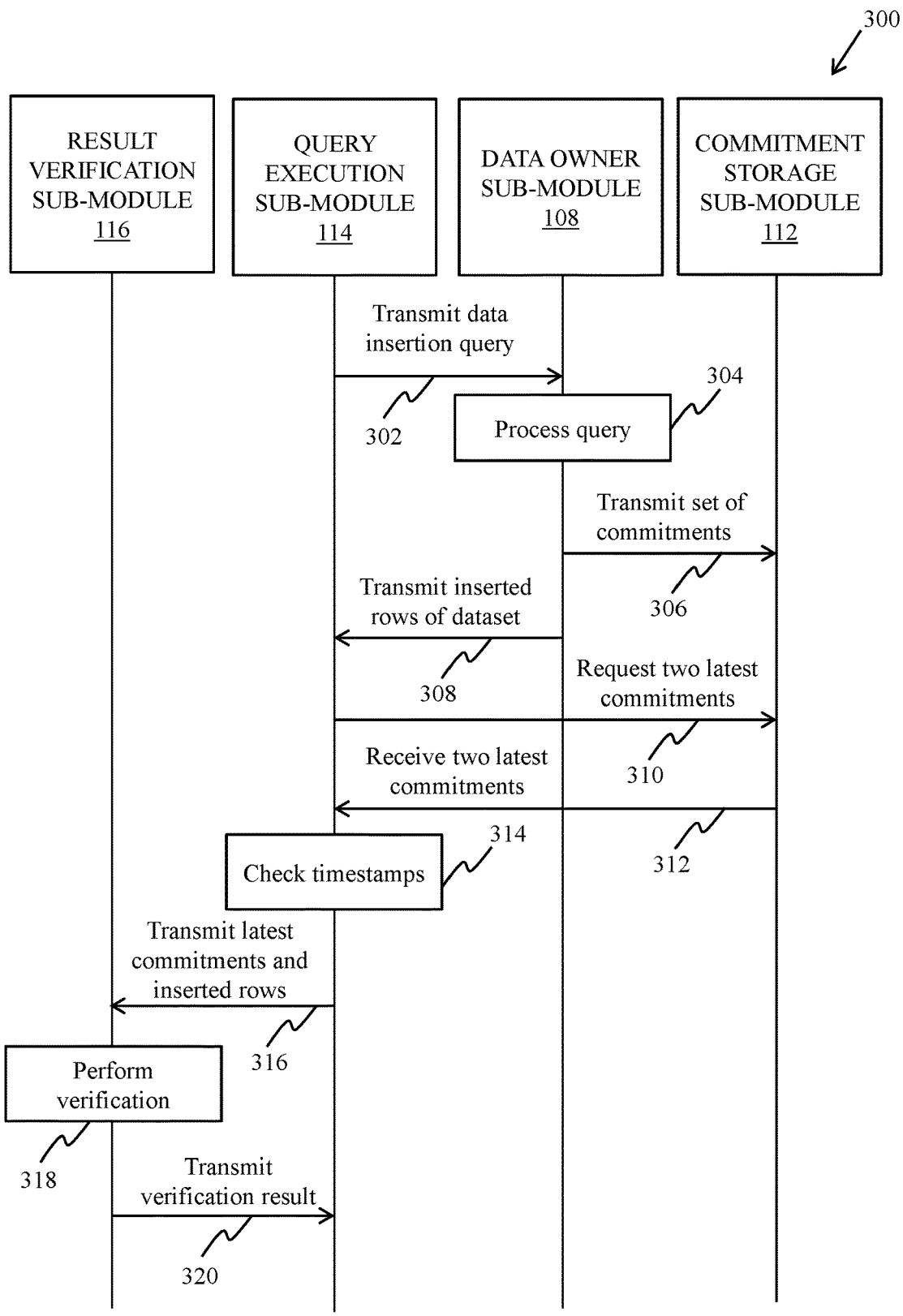
FIG. 3 illustrates a sequence diagram depicting operation of the system for an update of a query related to data insertion, in accordance with one or more exemplary embodiments of the present disclosure.

Referring to FIG. 3, illustrated is a process flow 300 depicting operations of a system (such as, the system 100 shown in FIG. 1) for an update of a query related to data insertion, in accordance with one or more exemplary embodiments of the present disclosure. In the present embodiment, the process flow 300 implements the data owner sub-module 108, the commitment storage sub-module 112, the query execution sub-module 114 and the result verification sub-module 116.

It may be appreciated that proving data insertion may not be a direct use of this system 100 but being able to prove that an insertion to the dataset 110A is performed correctly is fundamental for the overall system 100 and for other operation that require generation of a proof, because it may provide the continuous updates of the set of commitments in the commitment storage sub-module 112. In an exemplary scenario, the system 100 may be connected to an application where users need to register and provide personal information to use the services provided by the application. For example, a user named "Alice" may need to register (such as a query related to data insertion) to the application. In such a case, the system 100 enables proving that the personal data belonging to the user Alice was successfully added to the system 100 as a result of the registration phase, without disclosing the dataset 110A (such as the data belonging to other users). Further, the system 100 may allow the data owner sub-module 108 to not be trusted, since the data owner sub-module 108 must prove that all the operations are performed as requested by the authorized users of the application.

At a step 302 of the process flow 300, the query execution sub-module 114, on behalf of the user Alice, transmits the query to the data owner sub-module 108. For example, the query may include a request to add personal data (such as insertion of rows associated with the personal data) belonging to the user Alice in the dataset 110A.

At a step 304 of the process flow 300, the data owner sub-module 108 may process or execute the update query related to data insertion. The execution may include augmentation of the personal data added to the dataset 110A with the homomorphic hash value of the query and related commitment (such as the Pedersen commitment).

At a step 306 of the process flow 300, the data owner sub-module 108 confirms the addition of the data by pushing (or transmitting) the set of commitments to the commitment storage sub-module 112. The set of commitments may include the homomorphic hash value of the current data included in the dataset 110A, the relevant zero-knowledge proof (such as, generated over the Pedersen commitments contained in the dataset 110A), and the cumulated hash value of the Pedersen commitments. The cumulated hash value may be generated due to the homomorphic hash method disclosed. Further, the cumulated hash value is appropriately signed to prove the authenticity. Herein, the set of commitments may further include the associated timestamp.

At a step 308 of the process flow 300, the data owner sub-module 108 transmits the inserted rows of the dataset 110A. For example, the data owner sub-module 108 transmits the inserted rows associated with the personal data of the user Alice to the query execution sub-module 114.

At a step 310 of the process flow 300, the query execution sub-module 114 asks or requests for the two latest commitment values, such as the first commitment value and the second commitment value from the commitment storage sub-module 112. For example, the query execution sub-module 114 asks for the latest commitment values, upon receiving the query result from the data owner sub-module 108.

At a step 312 of the process flow 300, the query execution sub-module 114 receives the two latest commitment values from the commitment storage sub-module 112. Herein, for example, the first commitment value C1 refers to the status of the dataset 110A before the request of the user Alice to register on the application and related to the insertion of data, and the second commitment value C2 refers to the status of the dataset 110A after reception of the request of the user Alice to register on the application made to the query execution sub-module 114. It may be noted that the first commitment value C1 and the second commitment value C2 includes the homomorphic hash value of the dataset 110A, associated zero-knowledge proof and related timestamp.

At a step 314 of the process flow 300, the query execution sub-module 114 performs a check that the first timestamp associated with the first commitment value C1 comes before the second timestamp associated with the second commitment value C2, upon reception of the first commitment value C1 and the second commitment value C2 from the commitment storage sub-module 112.

At a step 316 of the process flow 300, the query execution sub-module 114 is configured to transmit the first commitment value C1 and the second commitment value C2, as well as the inserted rows to the result verification sub-module 116.

At a step 318 of the process flow 300, the result verification sub-module 116 performs the verification by application of the homomorphic hash method to the inserted rows to obtain a function H(R). Further, the verification is performed by application of the subtraction operation between the homomorphic hash value contained in the first commitment value C1 and the function H(R), checking that the result is equal to the homomorphic hash value contained in the second commitment value C2. For the insertion query, the operation corresponds to C2-C1 to obtain the second update hash value. The result verification sub-module 116 further compares the first update hash value and the second update hash value. In order to check that the second update hash value equals the first update hash value, the addition operation may be applied, i.e., the operation is moved to a single equation, where X is the first update hash value, such that C1−C2=X may be C1=X+C2, or C2−C1=X may be C2=X+C1. Based on a match of the first update hash value with the second update hash value, the result verification sub-module 116 generates the verification result indicative of the successful verification.

At a step 320 of the process flow 300, the result verification sub-module 116 transmits the verification result to the query execution sub-module 114. In such a manner, the user Alice has a knowledge of the correct (or incorrect) behaviour of the data owner sub-module 108. In an embodiment, the verification result may be accessed by the user Alice via a user device, such as a smartphone or a laptop in communication with the system 100.

Figure 4:
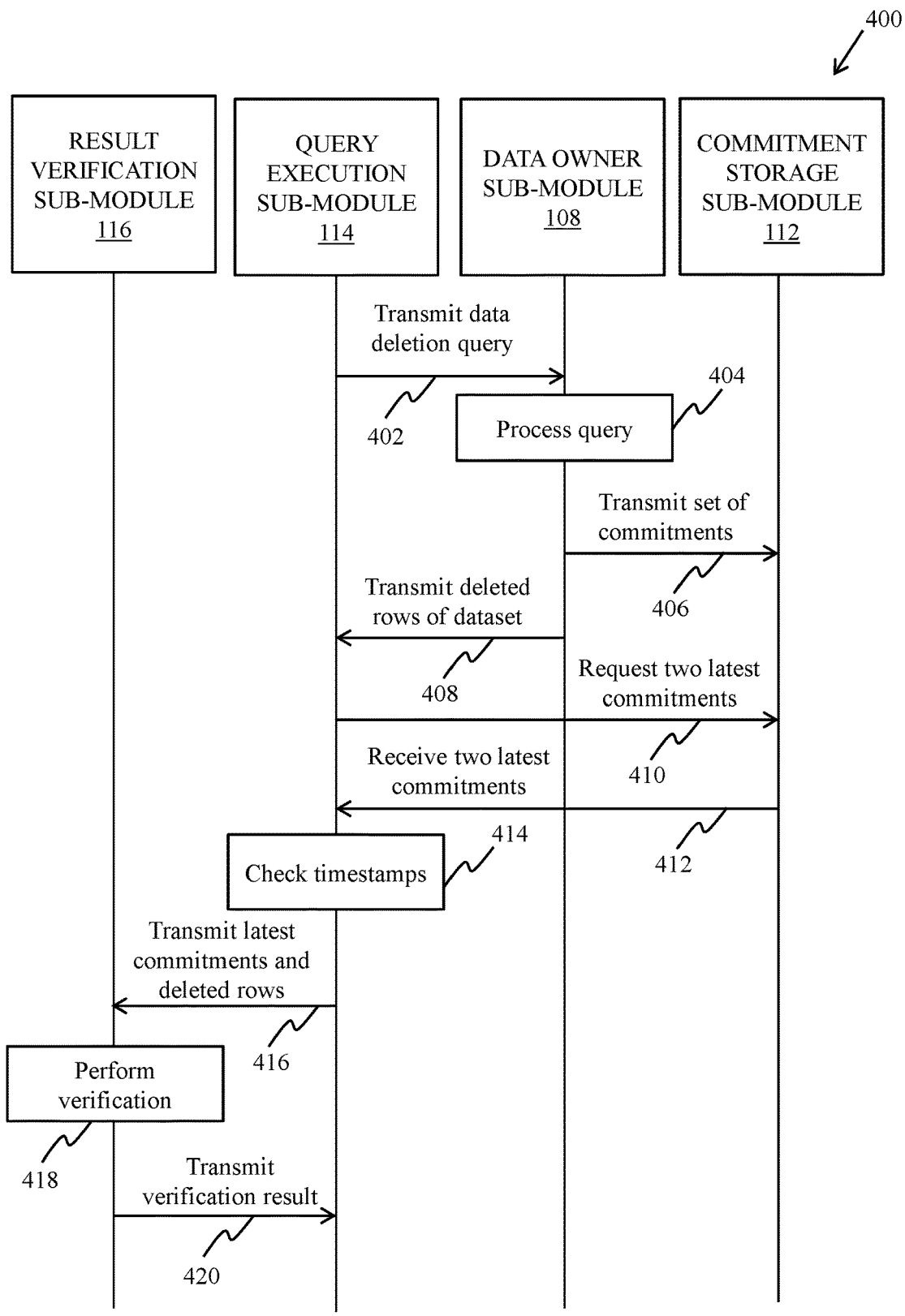
FIG. 4 illustrates a sequence diagram depicting operation of the system for an update of a query related to data deletion, in accordance with one or more exemplary embodiments of the present disclosure.

Referring to FIG. 4, illustrated is a process flow 400 depicting operation of the system (such as, the system 100) for an update of a query related to data deletion, in accordance with one or more exemplary embodiments of the present disclosure. In the present embodiment, the process flow 400 implements the data owner sub-module 108, the commitment storage sub-module 112, the query execution sub-module 114 and the result verification sub-module 116.

In an exemplary scenario, the system 100 is connected to the application where users need to register and provide personal information to use the services of the application. In some cases, users, such as a user Alice requires to deregister from the application. In such a case, the system 100 enables proving that the personal data belonging to the user Alice was deleted from the dataset 110A as result of the deregistration request, without disclosing the dataset 110A. Further, the system 100 enables non-requirement for the data owner sub-module 108 to be trusted, since the data owner sub-module 108 must prove that all the operation are performed as requested by authorized users.

At a step 402 of the process flow 400, the query execution sub-module 114, on behalf of the user Alice, transmits the query to the data owner sub-module 108. For example, the query may be a request to delete the personal data (such as deletion of rows associated with the personal data) belonging to the user Alice from the dataset 110A.

At a step 404 of the process flow 400, the data owner sub-module 108 may process or execute the update query related to data deletion. The execution may include deletion of the rows associated with the personal data from the dataset 110A.

At a step 406 of the process flow 400, the data owner sub-module 108 confirms the deletion of the data by pushing (or transmitting) the set of commitments to the commitment storage sub-module 112. The set of commitments may include the homomorphic hash value of the current data included in the dataset 110A, the relevant zero-knowledge proof (such as generated over the Pedersen commitments contained in the dataset 110A), and the cumulated hash value of the Pedersen commitments. The cumulated hash value may be generated due to the homomorphic hash method disclosed. The cumulated hash value is appropriately signed to prove the authenticity. The set of commitments further include the associated timestamp.

At a step 408 of the process flow 400, the data owner sub-module 108 transmits the deleted rows of the dataset 110A. For example, the data owner sub-module 108 transmits the deleted rows associated with the personal data of the user Alice to the query execution sub-module 114.

At a step 410 of the process flow 400, the query execution sub-module 114 asks or requests for the two latest commitment values, such as the first commitment value and the second commitment value from the commitment storage sub-module 112. For example, the query execution sub-module 114 asks for the latest commitment values, upon receiving the query result from the data owner sub-module 108.

At a step 412 of the process flow 400, the query execution sub-module 114 receives the two latest commitment values from the commitment storage sub-module 112. Herein, for example, the first commitment value C1 refers to the status of the dataset 110A before the request of the user Alice to register on the application and related to the deletion of data), and the second commitment value C2 refers to the status of the dataset 110A after reception of the request of the user Alice to deregister from the application made to the query execution sub-module 114. It may be noted that the first commitment value C1 and the second commitment value C2 includes the homomorphic hash value of the dataset 110A, associated zero-knowledge proof and related timestamp.

At a step 414 of the process flow 400, the query execution sub-module 114 performs a check that the first timestamp associated with the first commitment value C1 comes before the second timestamp associated with the second commitment value C2, upon reception of the first commitment value C1 and the second commitment value C2 from the commitment storage sub-module 112.

At a step 416 of the process flow 400, the query execution sub-module 114 is configured to transmit the first commitment value C1 and the second commitment value C2 and the deleted rows to the result verification sub-module 116.

At a step 418 of the process flow 400, the result verification sub-module 116 performs the verification by application of the homomorphic hash method to the inserted rows to obtain the function H(R). Further, the verification is performed by application of the subtraction operation between the homomorphic hash value contained in the first commitment value C1 and the function H(R), checking that the result is equal to the homomorphic hash value contained in the second commitment value C2. For the update query being a deletion query, the operation corresponds to C1-C2 to obtain the second update hash value. The result verification sub-module 116 further compares the first update hash value and the second update hash value. In order to check that the second update hash value equals the first update hash value, the addition operation may be applied, i.e., the operation is moved to a single equation, where X is the first update hash value, such that C1−C2=X may be C1=X+C2, or C2−C1=X may be C2=X+C1. Based on the match of the first update hash value with the second update hash value, the result verification sub-module 116 generates the verification result indicative of a successful verification.

At a step 420 of the process flow 400, the result verification sub-module 116 transmits the verification result to the query execution sub-module 114. In such a manner, the user Alice has a knowledge of the correct (or incorrect) behaviour of the data owner sub-module 108. In an embodiment, the verification result may be accessed by the user Alice via the user device, such as the smartphone or the laptop in communication with the system 100.

Figure 5:
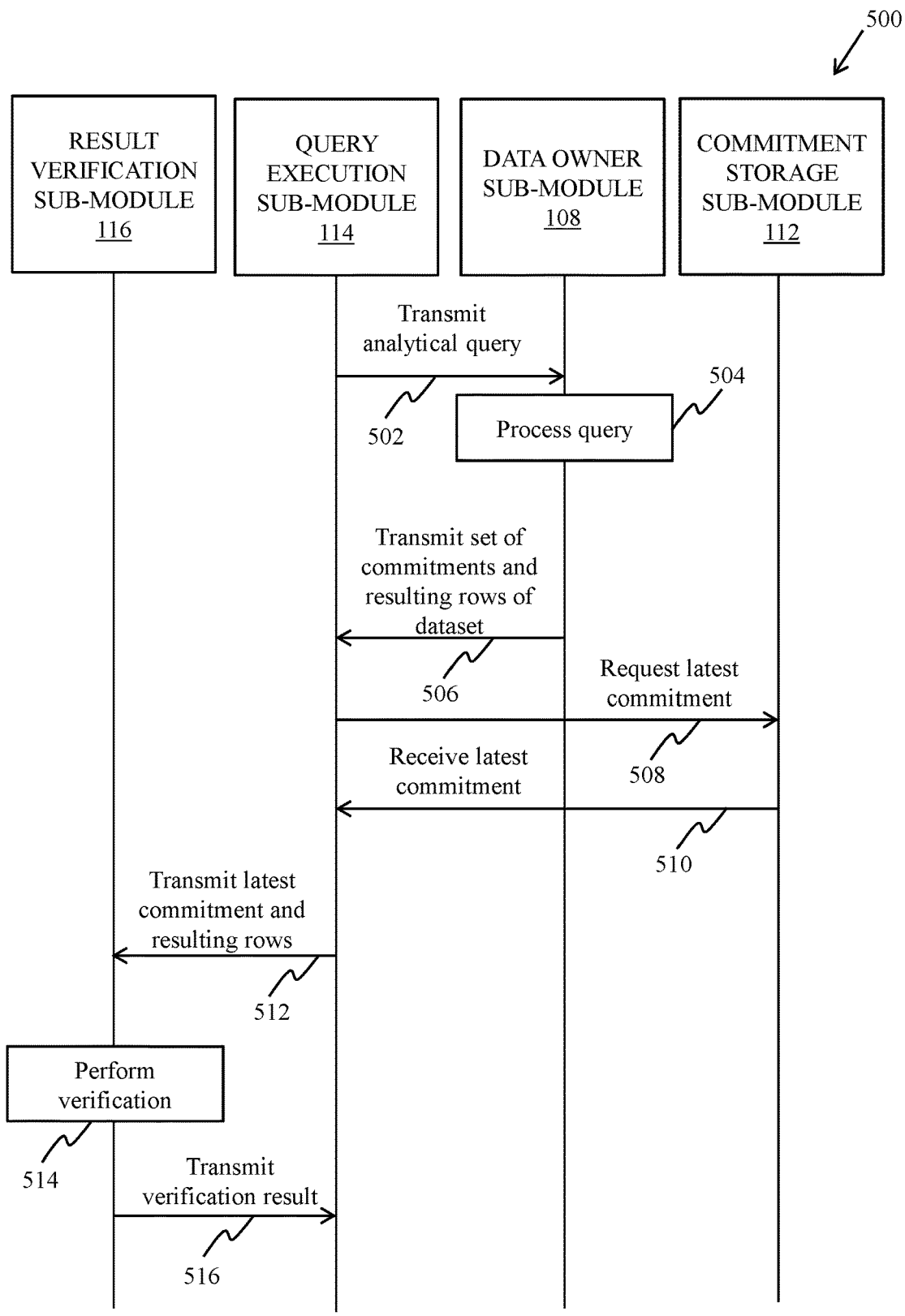
FIG. 5 illustrates a sequence diagram depicting operation of the system for an analysis of a query, in accordance with one or more exemplary embodiments of the present disclosure.

Referring to FIG. 5, illustrated is a process flow 500 depicting operation of the system (such as, the system 100) for an analysis of a query, in accordance with one or more exemplary embodiments of the present disclosure. The process flow 500 implements the data owner sub-module 108, the commitment storage sub-module 112, the query execution sub-module 114 and the result verification sub-module 116.

In an exemplary scenario, the system 100 is connected to the application where users need to register and provide personal information to use the services. Further, the users need the registration to keep track. The users may keep track of their data stored in the dataset 110A and generation of the commitments related to insertion of the data. Some external users, such as a government entity that may be authorized, may require the execution of analytical queries for controlling purposes. For example, the government entity may require operations executed by all the users in the application in a year 2020. In another example, the government entity may require operations executed by a certain user such as Alice. Thus, the system 100 enables answering such queries without the need to disclose the entire dataset 110A and without the need to trust the data owner sub-module 108, since the data owner sub-module 108 must prove that all the operation are performed as requested by authorized users and that the result of the query has both completeness and soundness properties.

At a step 502 of the process flow 500, the query execution sub-module 114, on behalf of the government entity, transmits the analytical query to the data owner sub-module 108. For example, the query may be a request to receive operations associated with the user Alice.

At a step 504 of the process flow 500, the data owner sub-module 108 may process or execute the analytical query related to reception of the operations.

At a step 506 of the process flow 500, the data owner sub-module 108 transmits the set of commitments along with the resulting rows of the dataset 110A. The set of commitments may include the homomorphic hash values of all the rows contained in the dataset 110A on which the query is executed, represented by the function (H(R)) and the zero-knowledge proof related to the number of rows returned by the query execution (P). The said zero-knowledge proof is required to prove that the rows returned by the query are all and only those that satisfies the constraint of the query (in this case, that the operations are executed by the user Alice).

At a step 508 of the process flow 500, the query execution sub-module 114 asks or requests for the latest commitment value from the commitment storage sub-module 112. For example, the query execution sub-module 114 asks for the latest commitment value, upon reception of the query result (R) from the data owner sub-module 108.

At a step 510 of the process flow 500, the query execution sub-module 114 receives the latest commitment value from the commitment storage sub-module 112. For example, the latest commitment value C refers to the latest status of the dataset 110A to the query execution sub-module 114. It may be noted that the latest commitment value C includes the homomorphic hash value of the dataset 110A, associated zero-knowledge proof and related timestamp.

At a step 512 of the process flow 500, the query execution sub-module 114 is configured to transmit the latest commitment value C and the resulting rows to the result verification sub-module 116.

At a step 514 of the process flow 500, the result verification sub-module 116 performs the verification. The verification is performed by application of the homomorphic hash method to the resulting rows contained in the dataset 110A, obtaining the set of homomorphic hash values. Further, the verification includes checking of the homomorphic hash values that are stored in the dataset 110A. Further, the verification includes checking that the sum of the homomorphic hash values contained in the dataset 110A is equal to the homomorphic hash value included in latest commitment value C. Furthermore, the verification includes checking that the zero-knowledge proof contained in the latest commitment value C is valid. Notably, in order to check the zero-knowledge proof, the Pedersen commitments contained in the zero-knowledge proof are accessed to obtain their homomorphic hash values. The obtained homomorphic hash values summed up and checked if the obtained cumulated hash value is equal to the signed hash value included in the zero-knowledge proof. Thus, the said verification along with the previous equality check enables verification that the dataset 110A on which the query is executed is up to date. Finally, the result verification sub-module 116 checks that the zero-knowledge proof is valid. The valid the zero-knowledge proof implies that the resulting rows contained in the dataset 110A are all and only those that answer the initial query.

At a step 516 of the process flow 500, the result verification sub-module 116 transmits the verification result to the query execution sub-module 114. In such a manner, the government entity has a knowledge of the correct (or incorrect) behaviour of the data owner sub-module 108. In an embodiment, the verification result may be accessed by the government entity via device or a server in communication with the system 100.

Figure 6:
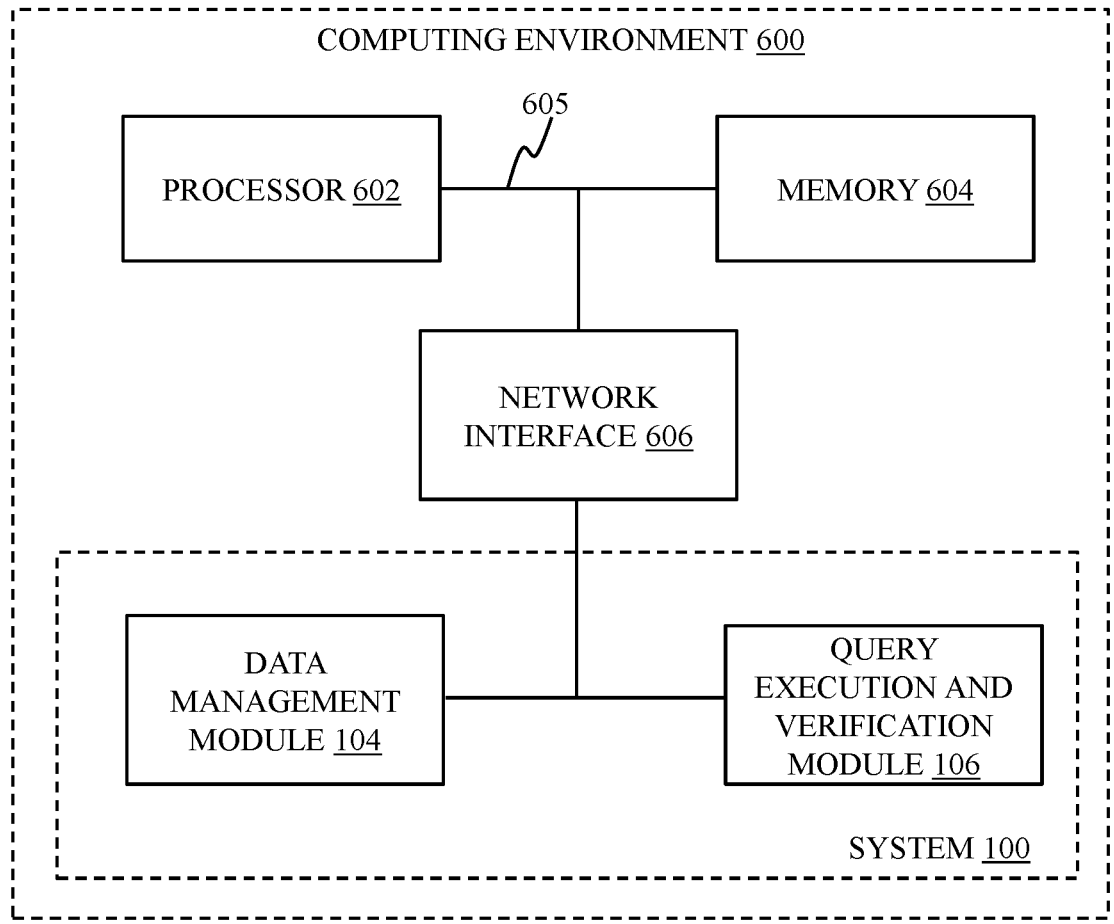
FIG. 6 illustrates a block diagram of exemplary components of the system of FIG. 1, in accordance with one or more exemplary embodiments of the present disclosure.

FIG. 6 illustrates a block diagram of a computing environment 600 in which the system 100 of FIG. 1 is implemented, in accordance with one or more exemplary embodiments of the present disclosure. In an embodiment, as discussed, the computing environment 600 may be the computing device on which the system 100 may be executed, with the two terms being interchangeably used hereinafter. In particular, the system 100 may reside on or may be executed by one or multiple computing devices (such as the computing environment 600). The computing device 600 includes a processor 602, a memory 604, and a network interface 606. The computing device 600 helps with execution of operations of the data management module 104 and the query execution and verification module 106 of the system 100. Examples of computing device 600 may include, but are not limited to, a personal computer(s), a laptop computer(s), mobile computing device(s), a server computer, a series of server computers, a mainframe computer(s), or a computing cloud(s). In general, the "computing device" in connection with embodiments of the present may be understood to mean for example a computer or a computer system, a client, a smartphone, a device or a server that are in each case arranged outside the blockchain or are not participants in the distributed database (for example the blockchain) (that is to say do not perform operations with the distributed database or only query it without however performing transactions, inserting data blocks or calculating proof of work). As an alternative, the computing device 600 may also in particular be understood to mean a node of the distributed database (as explained later in the description).

In certain implementations, the computing device 600 may be a physical or virtual device. In many implementations, the computing device 600 may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

In an example, the computing device 600 may be configured to run a computer-program product programmed for performing the said purpose. In another example, the computing device 600 may be a non-transitory computer readable medium on which program code sections of a computer program are saved, the program code sections being loadable into and/or executable in a system to make the system execute the steps for performing the said purpose. The computing device 600 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device 600 can be implemented in a single chip. The system of the present disclosure as discussed in the preceding paragraphs may include or be embodied in the computing device 600. It may be appreciated that the two systems and (and the corresponding components/elements) may be equivalent for the purposes of the present disclosure.

In one embodiment, the computing device 600 includes a communication mechanism 605 (such as a bus 605) for passing information among the components of the computing device 600. Herein, in particular, the processor 602 has connectivity to the bus 605 to execute instructions and process information stored in the memory 604. The processor 602 may include one or more processing cores with each core configured to perform independently. A multi-core processor enables multiprocessing within a single physical package. Examples of a multi-core processor include two, four, eight, or greater numbers of processing cores. Alternatively, or in addition, the processor 602 may include one or more microprocessors configured in tandem via the bus 605 to enable independent execution of instructions, pipelining, and multithreading. The processor 602 may also be accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 602. Similarly, an ASIC can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 602 refers to a computational element that is configured to respond to and process instructions that drive the system 100. The processor 602 may cause the data management module 104 and the query execution and verification module 106 to perform their respective functions as described. In operation, the processor 602 is configured to perform all the operations of the system 100. Examples of implementation of the processor 602 may include, but is not limited to, a central processing unit (CPU), a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor 602 may refer to one or more individual processors, processing devices and various elements associated with a processing device that may be shared by other processing devices.

The memory 604 refers to a storage medium, in which the data or software may be stored. The memory 604 includes both dynamic memory (e.g., RAM, magnetic disk, writable optical disk, etc.) and static memory (e.g., ROM, CD-ROM, etc.) for storing executable instructions that when executed perform the method steps described herein for writing and retrieval of data in a distributed ledger. In particular, the memory 604 includes a module arrangement to perform steps for writing and retrieval of data in a distributed ledger. The memory 604 also stores the data associated with or generated by the execution of the inventive steps. For example, the memory 604 may store the instructions that drives the system 100. Examples of implementation of the memory 604 may include, but are not limited to, Electrically Erasable Programmable Read-Only Memory (EEPROM), Read Only Memory (ROM), Hard Disk Drive (HDD), Solid-State Drive (SSD), and/or CPU cache memory.

Herein, the memory 604 may be volatile memory and/or non-volatile memory. The memory 604 may be coupled for communication with the processor 602. The processor 602 may execute instructions and/or code stored in the memory 604. A variety of computer-readable storage media may be stored in and accessed from the memory 604. The memory 604 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In some implementations, the instruction sets and subroutines of the system 100, which may be stored on a storage device, such as a storage device coupled to computer, may be executed by one or more processors and one or more memory architectures included within computer. In some implementations, one or more storage devices may include but are not limited to: hard disk drives; flash drives, tape drives; optical drives; RAID arrays; random access memories (RAM); and read-only memories (ROM). Examples of user devices (and/or computer) may include, but are not limited to, a personal computer, a laptop computer, a smart/data-enabled, cellular phone, a notebook computer, a tablet, a server, a television, a smart television, a media capturing device, and a dedicated network device.

In some implementations, the computing device 600 may include a data store, such as a database (e.g., relational database, object-oriented database, triple store database, etc.) and may be located within any suitable memory location, such as storage device coupled to computer. In some implementations, data, metadata, information, etc. described throughout the present disclosure may be stored in the data store. In some implementations, computer may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, the system 100 may be a component of the data store, a standalone application that interfaces with the above noted data store and/or an applet/application that is accessed via client applications. In some implementations, the above noted data store may be, in whole or in part, distributed in a cloud computing topology. In this way, computer and storage device may refer to multiple devices, which may also be distributed throughout the network.

In some implementations, the computing device 600 may execute an application for writing and retrieval of data in a distributed ledger, as described later in the description. In some implementations, the system 100 and/or application may be accessed via one or more of client applications. In some implementations, the system 100 may be a standalone application, or may be an applet/application/script/extension that may interact with and/or be executed within an application, a component of application and/or one or more of client applications. In some implementations, the application may be a standalone application, or may be an applet/application/script/extension that may interact with and/or be executed within the system 100, a component of the system 100, and/or one or more of client applications. In some implementations, one or more of client applications may be a standalone application, or may be an applet/application/script/extension that may interact with and/or be executed within and/or be a component of the system 100 and/or application. Examples of client applications may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications which may be stored on storage devices coupled to user devices may be executed by one or more processors and one or more memory architectures incorporated into user devices.

In some implementations, one or more of client applications may be configured to effectuate some or all of the functionality of the system 100 (and vice versa). Accordingly, in some implementations, the system 100 may be a purely server-side application, a purely client-side application, or a hybrid server-side/client-side application that is cooperatively executed by one or more of client applications and/or the system 100.

In some implementations, one or more of client applications may be configured to effectuate some or all of the functionality of application (and vice versa). Accordingly, in some implementations, application may be a purely server-side application, a purely client-side application, or a hybrid server-side/client-side application that is cooperatively executed by one or more of client applications and/or application. As one or more of client applications the system 100, and application taken singly or in any combination, may effectuate some or all of the same functionality, any description of effectuating such functionality via one or more of client applications the system 100, application or combination thereof, and any described interaction(s) between one or more of client applications the system 100, application or combination thereof to effectuate such functionality, should be taken as an example only and not to limit the scope of the disclosure.

In some implementations, one or more of users may access the system 100 (e.g., using one or more of user devices) directly through the network. In some implementations, the network may be connected to one or more secondary networks, examples of which may include but are not limited to: a local area network; a wide area network; or an intranet, for example. In some implementations, the computing device 600 may be connected to the network through secondary network with phantom link line.

The network interface 606 includes suitable logic, circuitry, and interfaces that may be configured to communicate with one or more external devices, such as a server or another computing device. Examples of the network interface 606 may include, but is not limited to, an antenna, a network interface card (NIC), a transceiver, one or more amplifiers, one or more oscillators, a digital signal processor, and/or a coder-decoder (CODEC) chipset.

In some implementations, the various user devices may be directly or indirectly coupled to the network. For example, user device may be directly coupled to the network via a hardwired network connection. Alternatively, user device may be wirelessly coupled to the network via wireless communication channel established between user device and wireless access point (i.e., WAP) which in turn may be directly coupled to the network. WAP may be, for example, an IEEE 802.11a, 802.11b, 802.11g, 802.11ac, 802.11ae, Wi-Fi®, RFID, and/or Bluetooth™ (including Bluetooth™ Low Energy) device that is capable of establishing wireless communication channel between user device and WAP. In other examples, user device may be wirelessly coupled to the network via wireless communication channel established between user device and cellular network/bridge which may be directly coupled to the network. User devices may execute an operating system, examples of which may include but are not limited to, Android®, Apple® iOS®, Mac® OS X®; Red Hat® Linux®, or a custom operating system.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that enables, e.g., mobile phones, computers, smart phones, and other electronic devices to be interconnected using a short-range wireless connection. Other forms of interconnection (e.g., Near Field Communication (NFC)) may also be used.

It is to be understood that the system and computer-assisted method described herein may be implemented in various forms of hardware, software, firmware, special purpose processors, or a combination thereof. "Computer-assisted" in connection with embodiments of the present disclosure may be understood to mean for example an implementation of the method in which in particular a processor executes at least one method step of the method. One or more of the present embodiments may take a form of a computer program product comprising program modules accessible from computer-usable or computer-readable medium storing program code for use by or in connection with one or more computers, processors, or instruction execution system. A "module" or a "sub-module" in connection with embodiments of the invention may be understood to mean for example a processor and/or a storage unit for storing program commands. By way of example, the processor 602 is specifically configured so as to execute the program commands such that the processor 602 executes functions in order to implement or perform the method according to embodiments of the invention or a step of the method according to embodiments of the invention. For the purpose of this description, a computer-usable or computer-readable medium can be any apparatus that can contain, store, communicate, propagate, or transport the program for use by or in connection with the instruction execution system, apparatus, or device.

Figure 7:
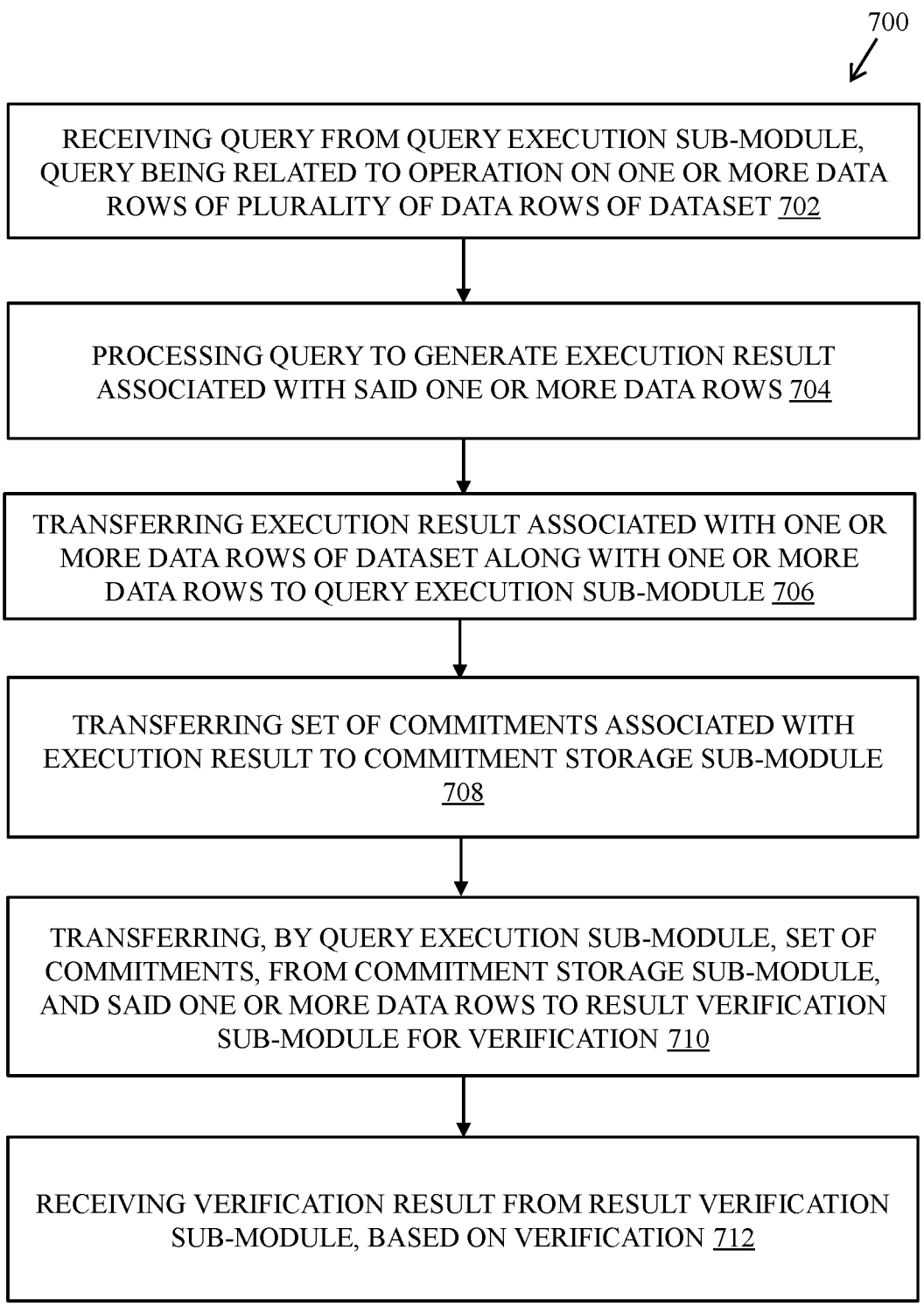
FIG. 7 illustrates a flowchart of a method for generation of a digital proof, in accordance with one or more exemplary embodiments of the present disclosure.

FIG. 7 illustrates a flowchart of a method 700 for generation of a digital proof, in accordance with one or more exemplary embodiments of the present disclosure. Various embodiments and variants disclosed above with respect to the system 100 apply mutatis mutandis to the method 700 as described hereinafter.

At a step 702, the query is received from the query execution sub-module, the query being related to the operation on one or more data rows of the plurality of data rows of the dataset. In accordance with an embodiment, the data management module is configured to receive the query received from the query execution sub-module, the query being related to the operation on one or more data rows of the plurality of data rows of the dataset.

At a step 704, the query is processed to generate the execution result associated with the said one or more data rows. In accordance with an embodiment, the data management module is configured to process the query to generate the execution result associated with the said one or more data rows.

At a step 706, the execution result associated with the one or more data rows of the dataset is transferred along with the one or more data rows to the query execution sub-module. In accordance with an embodiment, the data management module is configured to transfer the execution result associated with the one or more data rows of the dataset along with the one or more data rows to the query execution sub-module.

At a step 708, the set of commitments associated with the execution result is transferred to the commitment storage sub-module. In accordance with an embodiment, the data management module is configured to transfer the set of commitments associated with the execution result to the commitment storage sub-module.

At a step 710, the set of commitments, from the commitment storage sub-module, and the said one or more data rows are transferred to the result verification sub-module for verification. In accordance with an embodiment, the query execution sub-module is configured to transfer the set of commitments, from the commitment storage sub-module, and the said one or more data rows to the result verification sub-module for verification.

At a step 712, the verification result is received from the result verification sub-module, based on the verification. In accordance with an embodiment, the query execution sub-module is configured to receive the verification result from the result verification sub-module, based on the verification.

It may be appreciated that the steps 702 to 712 are only illustrative, and other alternatives can also be provided where one or more steps are added, one or more steps are removed, or one or more steps are provided in a different sequence without departing from the scope of the present disclosure.

In accordance with an embodiment, the query corresponds to at least one of the update of the one or more data rows of the dataset and the analysis of the one or more data rows of the dataset.

In accordance with an embodiment, in case of the query being the update of the one or more data rows of the dataset, the method includes application of the homomorphic hash technique on the execution result to generate the first update hash value. The method further includes application of one of the addition operation or the subtraction operation to the first commitment value and the second commitment value of the set of commitments to obtain the second update hash value. The method further includes comparison of the first update hash value and the second update hash value. The method further includes generation of the verification result indicative of the successful verification, if the first update hash value matches the second update hash value.

In accordance with an embodiment, the method comprises generating the verification result indicative of a failed verification, if the first update hash value does not match the second update hash value.

In accordance with an embodiment, in case of the query being the analysis of the one or more data rows of the dataset, the method includes application of the homomorphic hash technique to the one or more data rows included in the execution result and verification that they are included in the set of homomorphic hash values related to the data rows of the dataset 110A included in the execution result. Further, the method includes application of the addition operation on the one or more homomorphic hash values related to the data rows of the dataset 110A to generate the first analysis hash value. The method further includes retrieval of the latest commitment value of the set of commitments from the commitment storage sub-module 112. The method further includes generation of the first validation based on confirmation that the first analysis hash value matches the latest analysis hash value included in the retrieved latest commitment value. Furthermore, the method further includes generation of the second validation based on confirming that the zero-knowledge proof associated with the execution result is valid. Moreover, the method further includes generation of the verification result indicative of the successful verification, in response to generation of the first validation and the second validation.

In accordance with an embodiment, the method includes generating the verification result indicative of the failed verification, in response to at least one of failure of generation of the first validation or failure of generation of the second validation.

Exemplary aspects of the disclosure further provides a computer program comprising computer executable program code which when executed by a processor causes a system to perform the operations of any one of the above-mentioned claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

The invention claimed is:

1. A system for digital proof generation, comprising:
 a data management module configured to manage a dataset having a plurality of data rows, wherein each data row of the plurality of data rows includes data entries and each data row possess a hash value and a commitment for the hash value associated with corresponding data entries;
 a query execution and verification module comprising:
  a commitment storage sub-module configured to store a plurality of commitments of the dataset;
  a query execution sub-module configured to enable access to the dataset; and
  a result verification sub-module configured to verify an execution of a query, wherein the data management module is configured to:
  receive a query from the query execution sub-module, the query being related to an operation on one or more data rows of the plurality of data rows of the dataset;
  process the query to generate an execution result associated with the said one or more data rows;
  transfer the execution result associated with the one or more data rows of the dataset along with the one or more data rows to the query execution sub-module; and
  transfer a set of commitments associated with the execution result to the commitment storage sub-module, wherein the set of commitments includes at least one of: a homomorphic hash value of the dataset, a zero-knowledge proof associated with the execution result and a timestamp associated with each commitment of the set of commitments; and
wherein in the query execution and verification module, the query execution sub-module is configured to:
  transfer the set of commitments, from the commitment storage sub-module, and the said one or more data rows to the result verification sub-module for verification; and
  receive a verification result from the result verification sub-module, based on the verification.

2. The system according to claim 1, wherein the set of commitments correspond to one of: Pedersen commitments or Generalized Pedersen commitments.

3. The system according to claim 1, wherein the query execution sub-module is configured to check that a first timestamp of a first commitment value of the set of commitments to be preceding a time of a generation of the execution result and a second timestamp of a second commitment value of the set of commitments to be succeeding the time of the generation of the execution result, to indicate a successful verification.

4. The system according to claim 1, wherein the query corresponds to at least one of: update of the one or more data rows of the dataset and an analysis of the one or more data rows of the dataset.

5. The system according to claim 4, wherein, in case of the query being the update of the one or more data rows of the dataset, the result verification sub-module is configured to:
  apply a homomorphic hash technique on the execution result to generate a first update hash value;
  apply one of: an addition operation or a subtraction operation to a first commitment value and a second commitment value of the set of commitments to obtain a second update hash value;
  compare the first update hash value and the second update hash value; and
  generate the verification result indicative of a successful verification, if the first update hash value matches the second update hash value.

6. The system according to claim 5, wherein the result verification sub-module is configured to generate the verification result indicative of a failed verification, if the first update hash value does not match the second update hash value.

7. The system according to claim 4, wherein, in case of the query being the analysis of the one or more data rows of the dataset, the result verification sub-module is configured to:
  apply a homomorphic hash technique to the one or more data rows included in the execution result and verify that they are included in a set of homomorphic hash values related to the data rows of the dataset included in the execution result;
  apply an addition operation on the one or more homomorphic hash values related to the data rows of the dataset to generate a first analysis hash value;
  retrieve a latest commitment value of the set of commitments from the commitment storage sub-module;
  generate a first validation based on confirming that the first analysis hash value matches a latest analysis hash value included in the retrieved latest commitment value;
  generate a second validation based on confirming that a zero-knowledge proof associated with the execution result is valid; and
  generate the verification result indicative of a successful verification, in response to generation of the first validation and the second validation.

8. The system according to claim 7, wherein the result verification sub-module is configured to generate the verification result indicative of a failed verification, in response to at least one of: failure of generation of the first validation or failure of generation of the second validation.

9. The system according to claim 1, wherein the dataset is a private dataset.

10. A method for digital proof generation, comprising:
  receiving a query from a query execution sub-module, the query being related to an operation on one or more data rows of a plurality of data rows of a dataset;
  processing the query to generate an execution result associated with the said one or more data rows;
  transfer the execution result associated with the one or more data rows of the dataset along with the one or more data rows to the query execution sub-module; and
  transferring a set of commitments associated with the execution result to a commitment storage sub-module, wherein the set of commitments includes at least one of: a homomorphic hash value of the dataset, a zero-knowledge proof associated with the execution result and a timestamp associated with each commitment of the set of commitments; and
  transferring, by the query execution sub-module, the set of commitments, from the commitment storage sub-module, and the said one or more data rows to a result verification sub-module for verification; and
  receiving a verification result from the result verification sub-module, based on the verification.

11. The method according to claim 10, wherein the query corresponds to at least one of: update of the one or more data rows of the dataset and an analysis of the one or more data rows of the dataset.

12. The method according to claim 11, wherein in case of the query being the update of the one or more data rows of the dataset, the method comprises:
  applying a homomorphic hash technique on the execution result to generate a first update hash value;
  applying one of: an addition operation or a subtraction operation to a first commitment value and a second commitment value of the set of commitments to obtain a second update hash value;
  comparing the first update hash value and the second update hash value; and
  generating the verification result indicative of a successful verification, if the first update hash value matches the second update hash value.

13. The method according to claim 12, wherein the method comprises generating the verification result indicative of a failed verification, if the first update hash value does not match the second update hash value.

14. The method according to claim 11, wherein in case of the query being the analysis of the one or more data rows of the data set, the method includes:
applying a homomorphic hash technique to the one or more data rows included in the execution result and verify that they are included in a set of homomorphic hash values related to the data rows of the dataset included in the execution result;
applying an addition operation on the one or more homomorphic hash values related to the data rows of the dataset to generate a first analysis hash value;
retrieving a latest commitment value of the set of commitments from the commitment storage sub-module;
generating a first validation based on confirming that the first analysis hash value matches a latest analysis hash value included in the retrieved latest commitment value;
generating a second validation based on confirming that a zero-knowledge proof associated with the execution result is valid; and
generating the verification result indicative of a successful verification, in response to generation of the first validation and the second validation.

15. The method according to claim 14, wherein the method includes generating the verification result indicative of a failed verification, in response to at least one of: failure of generation of the first validation or failure of generation of the second validation.

16. A non-transitory computer readable medium having stored thereon software instructions that, when executed by a processor, cause the processor to be implemented for digital proof generation, by executing the steps comprising:
receiving a query from a query execution sub-module, the query being related to an operation on one or more data rows of a plurality of data rows of a dataset;
processing the query to generate an execution result associated with the said one or more data rows;
transfer the execution result associated with the one or more data rows of the dataset along with the one or more data rows to the query execution sub-module; and
transferring a set of commitments associated with the execution result to a commitment storage sub-module, wherein the set of commitments includes at least one of: a homomorphic hash value of the dataset, a zero-knowledge proof associated with the execution result and a timestamp associated with each commitment of the set of commitments; and
transferring, by the query execution sub-module, the set of commitments, from the commitment storage sub-module, and the said one or more data rows to a result verification sub-module for verification; and
receiving a verification result from the result verification sub-module, based on the verification.

17. The non-transitory computer-readable medium according to claim 16, wherein the query corresponds to at least one of: update of the one or more data rows of the dataset and an analysis of the one or more data rows of the dataset.

18. The non-transitory computer-readable medium according to claim 17, wherein in case of the query being the update of the one or more data rows of the dataset, the processor is configured to execute the steps comprising:
applying a homomorphic hash technique on the execution result to generate a first update hash value;
applying one of: an addition operation or a subtraction operation to a first commitment value and a second commitment value of the set of commitments to obtain a second update hash value;
comparing the first update hash value and the second update hash value; and
generating the verification result indicative of a successful verification, if the first update hash value matches the second update hash value.

19. The non-transitory computer-readable medium according to claim 17, wherein in case of the query being the analysis of the one or more data rows of the dataset, the processor is configured to execute the steps comprising:
applying a homomorphic hash technique to the one or more data rows included in the execution result and verify that they are included in a set of homomorphic hash values related to the data rows of the dataset included in the execution result;
applying an addition operation on the one or more homomorphic hash values related to the data rows of the dataset to generate a first analysis hash value;
retrieving a latest commitment value of the set of commitments from the commitment storage sub-module;
generating a first validation based on confirming that the first analysis hash value matches a latest analysis hash value included in the retrieved latest commitment value;
generating a second validation based on confirming that a zero-knowledge proof associated with the execution result is valid; and
generating the verification result indicative of a successful verification, in response to generation of the first validation and the second validation.

* * * * *